(12) United States Patent
Arnason

(10) Patent No.: US 9,861,112 B2
(45) Date of Patent: Jan. 9, 2018

(54) BATCHING WITH VISION

(71) Applicant: SKAGINN HF, Akranes (IS)

(72) Inventor: Ingolfur Arnason, Akranes (IS)

(73) Assignee: SKAGINN HF, Akranes (IS)

( * ) Notice: Subject to any disclaimer, the term of this patent is extended or adjusted under 35 U.S.C. 154(b) by 0 days.

(21) Appl. No.: 15/309,044

(22) PCT Filed: May 5, 2015

(86) PCT No.: PCT/IS2015/050004
§ 371 (c)(1),
(2) Date: Nov. 4, 2016

(87) PCT Pub. No.: WO2015/170348
PCT Pub. Date: Nov. 12, 2015

(65) Prior Publication Data
US 2017/0112152 A1    Apr. 27, 2017

(30) Foreign Application Priority Data
May 5, 2014    (IS) .............................................. 9044

(51) Int. Cl.
| B07C 5/04 | (2006.01) |
| A22C 25/04 | (2006.01) |
| B07C 5/16 | (2006.01) |
| B07C 5/342 | (2006.01) |
| A22C 25/08 | (2006.01) |
| B63B 35/24 | (2006.01) |
| B07C 5/36 | (2006.01) |

(52) U.S. Cl.
CPC .............. *A22C 25/04* (2013.01); *A22C 25/08* (2013.01); *B07C 5/16* (2013.01); *B07C 5/342* (2013.01); *B63B 35/24* (2013.01); *B07C 5/361* (2013.01)

(58) Field of Classification Search
CPC .... B07C 5/02; B07C 5/16; B07C 5/28; B07C 5/342; B07C 5/361; B07C 5/38; B07C 2501/0081; A22C 25/04; A22C 25/08; B63B 35/24
See application file for complete search history.

(56) References Cited

U.S. PATENT DOCUMENTS

| 4,410,091 A * | 10/1983 | Cowlin .................... B07C 5/00 209/546 |
| 4,934,537 A | 6/1990 | DeBourke |

(Continued)

FOREIGN PATENT DOCUMENTS

WO    90/11142 A1    10/1990

OTHER PUBLICATIONS

Iceland Search Report from corresponding Iceland Application No. 9044, dated Aug. 14, 2014.
(Continued)

*Primary Examiner* — Joseph C Rodriguez
(74) *Attorney, Agent, or Firm* — Justin J. Cassell; Workman Nydegger

(57) ABSTRACT

The present invention relates to an apparatus for batching items such as fish. The object is specifically to batch smaller items like pelagic fish, such as mackerel and herring or salmon. The batching apparatus and method of the present invention uses at least one image means to provide faster batching with more accuracy and less give-away.

20 Claims, 2 Drawing Sheets

(56) References Cited

U.S. PATENT DOCUMENTS

| | | | | |
|---|---|---|---|---|
| 5,184,733 A * | 2/1993 | Arnarson | .............. | A22C 25/00 177/1 |
| 5,460,271 A * | 10/1995 | Kenny | .............. | B07C 5/02 198/453 |
| 5,758,477 A * | 6/1998 | Wilson, Jr. | .............. | B65B 57/14 53/147 |
| 6,060,667 A * | 5/2000 | Pollock | .............. | G01G 13/08 177/121 |
| 6,268,571 B1 * | 7/2001 | Benyukhis | .............. | G01G 19/393 177/25.18 |
| 6,712,221 B2 * | 3/2004 | Kvisgaard | .............. | B07C 5/18 177/25.11 |
| 6,898,482 B2 * | 5/2005 | Thorvaldsson | .............. | A22B 5/0064 452/150 |
| 7,258,237 B2 * | 8/2007 | Nielsen | .............. | B07C 5/16 177/145 |
| 7,610,167 B2 * | 10/2009 | Stanton | .............. | B29B 7/603 141/13 |
| 8,091,712 B2 * | 1/2012 | Thorsson | .............. | B07C 5/38 209/559 |
| 8,758,100 B2 * | 6/2014 | Larsen | .............. | A22C 25/08 452/178 |
| 8,985,341 B2 * | 3/2015 | Lapeyre | .............. | B07C 5/38 209/546 |
| 9,381,545 B2 * | 7/2016 | Cadieux, Jr. | .............. | B07C 5/342 |
| 9,555,447 B2 * | 1/2017 | Lykkegaard | .............. | B07C 5/02 |
| 2013/0066462 A1 | 3/2013 | Serjeantson et al. | | |
| 2014/0168411 A1 * | 6/2014 | Ledet | .............. | A22C 29/023 348/89 |
| 2017/0071221 A1 * | 3/2017 | Arnason | .............. | A22C 17/10 |
| 2017/0245509 A1 * | 8/2017 | Petersen | .............. | A22C 17/008 |

OTHER PUBLICATIONS

International Search Report from corresponding PCT Application No. PCT/IS2015/050004, dated Aug. 5, 2015.

* cited by examiner

BATCHING WITH VISION

FIELD OF THE INVENTION

The present invention relates to an apparatus, a fishing vessel and a method for batching items, such as fish, using vision technology. Moreover, the present invention relates to fast batching methods of fish such as salmon, herring or mackerel in large quantities with minimum give-away.

BACKGROUND OF THE INVENTION

Items or objects such as many food objects are marketed and sold in batches of predetermined size, weight or number of objects in each package. Batching of items which are in large quantity and require a speedy process requires that a certain amount of items or weight is given by the produces. This is due to the fact that the marketing promises a minimum weight or number of items in each package. This is costly, specifically when batching millions or tons of items every day.

Traditionally, batches are made by forming a coarse batch in a collection bin and then selecting more carefully a remaining number or weight to fill the batch with to close it. Another way is to combine a known number or weight of items on a processing line after detection and divert them collection bins they have been assigned to. The computer then calculates the best fit and assigns each item or a pre-batch of items to a certain bin. This is however not attractive when batching a very large number of items or where speed is important.

One of the problems with batching small items in large quantities is the speed factor. When batching items like pelagic fish, which are caught and handled in enormous quantity and numbers, speed and accuracy are often difficult to combine. Some of the problems with maintaining an acceptable speedy process are that there will always be a contamination of other species, damaged or bad quality items in-between and the difficulty of maintaining minimum weight in each batch. Most batching systems on the market today use a human worker to monitor the processing/batching line to manually eject damaged fish or fish or wrong species. This is both time consuming and expensive and inaccurate way of ejecting bad quality fish and wrong species of the line. With respect to maintaining minimum weight in each batch, the cost of speed is more give away in each batch to secure that all batches are above minimum weight. For example, when batching mackerel into 15 Kg portions, the give-away is approximately 0.5 Kg. This is due to fact that there will always be contaminations of other pelagic species like herring in the batches as well as some bad quality fish, which are not spotted by the human eye. In addition to that, there always has to be some give-away in each batch to secure a minimum weight, in this case 15 Kg. A give away of approximately 0.5 Kg amounts to a considerable amount of weight when tons of fish are being batched every day.

SUMMARY OF THE INVENTION

It is an object of the present invention to overcome or ameliorate the aforementioned drawbacks of the prior art and to provide an improved and/or alternative and/or additional method, apparatus or fishing vessel for batching items such as fish. It is one preferred object of the present invention to provide a device with two image means, one camera for speed control of in-feeding and a second camera for image analysis of items to provide faster batching with more accuracy and less give-away. Moreover, it is a preferred object of the present invention to provide an efficient design, preferably with to transport each item separately and to perform an image analysis of each item at high speed and determine the destination based on the image data. Another preferred object of the present invention is to provide a device having conveyor belt with separated spaces to transport each item separately and where the conveyor has an inclining and a declining portion. Between separations or cleats in the conveyor belt, pockets are formed to fit one item in each pocket. It is the combination of a) speed control during in-feeding, b) transporting each item separately and c) rolling the item over an axis as it passes the point from the inclining to the declining portion making the item shift position/moving in the pocket and thereby allowing the second image means to get more than one view of the item, which provides the improved method and device resulting in faster batching with more accuracy and less give-away.

The object(s) underlying the present invention is (are) particularly solved by the features defined in the independent claims. The dependent claims relate to preferred embodiments of the present invention. Further additional and/or alternative aspects are discussed below.

The present invention relates to an apparatus for batching items such as fish. The object is to batch items like pelagic fish, such as mackerel and herring or salmon. Thus, at least one of the preferred objects of the present invention is solved by an apparatus for batching items where a cleated conveyor receives items from an in-feed station, but the in-feed station is loaded by items coming off an in-feed conveyor. One camera can be positioned above the inclining portion of the cleated conveyor belt and is directed towards the in-feed station, which can be a receptacle situated below the in-feed conveyor. The cleated conveyor belt obtains items from the receptacle and the camera directed to the in-feed station determines the volume of items in the receptacle by altering the speed of the in-feed conveyor to ensure a sufficient volume of items in the in-feed station. The camera which determines the volume in the in-feed station is optional. The high point of the cleated conveyor belt, i.e. after the inclining portion and before the declining portion is narrow and defined by only the distance between two adjacent cleats of the conveyor belt. Another camera is positioned directly above the high point of the cleated conveyor belt and captures images of the item as it is transported thereby. As the fish rolls over the high point during the movement of the cleated conveyor belt from the inclining movement to the declining movement the fish rolls from side to side and therefore, the camera is able to capture more than one side/view of the fish. This is very important in determining the weight and condition of the item/fish as well as determining if it is of a "wrong" species for this batch. The declining portion of the belt has a determined number of pockets before the last item in the declining portion falls onto a diverting means and is diverted away from the batch or into the batch. By having image data of all the items in the pockets on the declining portion of the belt a computer can select the best fit of items to go into the batch or to complete the batch and divert the remaining items back into the in-feed station. The selection of items is based on the characteristics determined by the camera. Therefore, if the characteristic is weight, then the collection bin will be positioned on weight cells. So when the batch is to be completed, the selection of items on the declining portion of the belt is based on what items fit best to give a predetermined weight of the batch. If however the items are being batched based on colour, species or the like, the unwanted items would be diverted to a take away conveyor while the correct fit would be diverted into the collection bin.

The benefits of the apparatus and the method of the present invention are that the camera, which detects the volume in the in-feed station allows for better control of in-feeding than prior art methods as the volume in the in-feed station is monitored constantly. So if the volume becomes too low, the computer increases the speed of the in-feed conveyor. This significantly increases the likelihood that all of the pockets on the cleated conveyor belt contain one item, which increases the speed and the throughput of the system. The camera allows determination of several characteristics of each item and therefore optimises the batching as the items, with the best fit on the declining portion of the belt, can be selected to close a batch. This not only reduces giveaway, but keeps up with the fast in-feed speed based on that each pocket on the cleated conveyor belt contains one item, and therefore does not compromise the speed of the system. Furthermore, the camera is able to give a view of more than one side/part of the fish, as it rolls over in the pocket at the high point of the cleated conveyor belt. The camera can also detect damaged items and wrong species without compromising the speed or quality of batches. Prior methods and systems have to set the giveaway higher due to the fact that there will always be a certain amount of damaged items or wrong species in a given percentage of the batches. This is solved by the apparatus of the present invention, which results in that give away can be reduced significantly.

Therefore, the combination of the in-feed control, where a sufficient amount of items in the in-feed stations allows the belt to fill each pocket with one item and the fact that all the items in the out-feed portion of the cleated conveyor belt can be selected to close a batch provide a faster batching method for large quantity items like pelagic fish or salmon. Furthermore, the image analysis, which can predict weight, determine colour, detect wrong species and damaged items as well as the on selection of items the out-feed portion of the cleated conveyor belt allow for a batching method with less give-away because of the speed, accuracy and decreased odds of damaged items or the wrong species items in the batch.

In a first aspect of the present invention an apparatus is provided for batching items. The apparatus comprises an in-feed means, an in-feed station and a batching conveyor belt. The batching conveyor belt is a cleated conveyor belt, where a portion of the batching conveyor belt is raised by an axle relative to an in-feed and an out feed end of the batching conveyor belt. The apparatus further comprises a first image means to determine at least one characteristic property of the items as the items pass over the axle. The apparatus also comprises diverting means, at least one collection bin and computing means. The computing means regulates the transport of items on the in-feed means to the in-feed station in response to data from the first image means.

The selected items are then diverted to the collection bin by the diverting means based on data from the first image means.

In a second aspect of the present invention a method is provided for batching items. The method comprising the steps of:

transporting the items to an in-feed station by an in-feed means, transporting the items from the in-feed station to a collection bin on a batching conveyor, where the batching conveyor belt is a cleated conveyor belt and where a portion of the batching conveyor belt is raised by an axle between an in-feed and an out feed end of the batching conveyor belt, determining at least one characteristic property of the items by a first image means as the items pass over the axis during transport from the in-feed to the out feed end of the batching conveyor belt, diverting selected items to a collection bin by a diverting means, In a third aspect of the present invention a fishing vessel is provided for catching and slaughtering fish, said fishing vessel comprising an apparatus for batching items. The apparatus comprises an in-feed means, an in-feed station and a batching conveyor belt. The batching conveyor belt is a cleated conveyor belt, where a portion of the batching conveyor belt is raised by an axle relative to an in-feed and an out feed end of the batching conveyor belt. The apparatus further comprises a first image means to determine at least one characteristic property of the items as the items pass over the axle. The apparatus also comprises diverting means, at least one collection bin and computing means. The computing means regulates the transport of items on the in-feed means to the in-feed station in response to data from the first image means.

The method is characterised in that the computing means regulates the transport of items on the in-feed means to the in-feed station in response to data from the first image means and in that the selected items are diverted to the collection bin by the diverting means and a computing means based on data from the first image means.

Accordingly, the combination of speed controlled in-feeding and transporting of single items through the device and rolling the items over as the pass the high point from the inclining to the declining portion of the belt making the item shift position or movie from side to side in the pocket and thereby allowing the second image means to get more than one view of the item, which facilitates faster batching with more accuracy and less give-away. Furthermore, the image data can be distributed to a controller on the ship or on-shore for directors of fisheries, fish factories, fish markets, research institutes or surveillance authorities.

DESCRIPTION OF THE INVENTION

Figure 1:
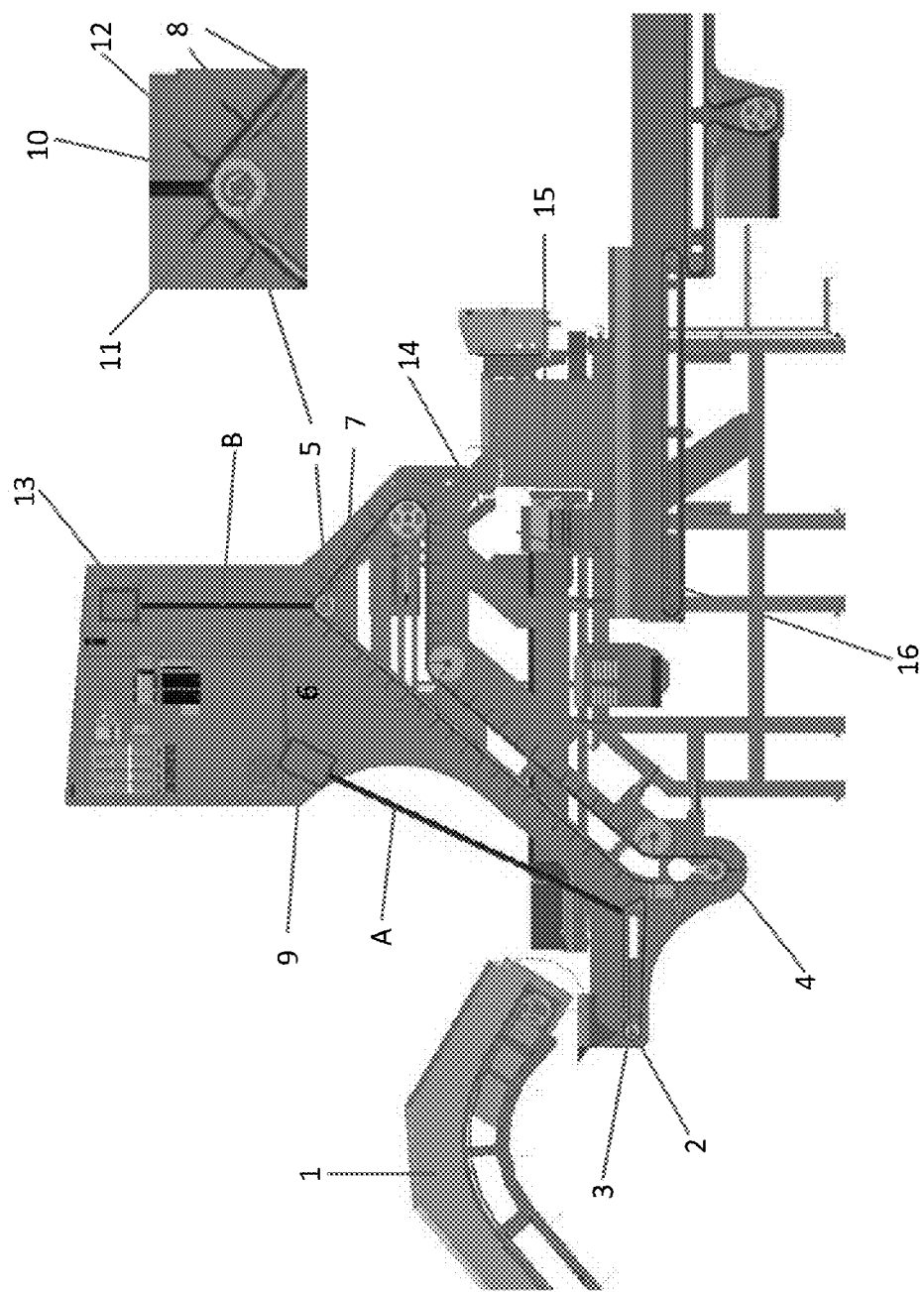
FIG. 1 shows the different components of the apparatus.

The following embodiments relate to the method and the apparatus of the invention.

In an embodiment of the present invention a second image means is directed to the in-feed station to detect the volume of items in the in-feed station, where the computing means regulates the transport of items on the in-feed means in response to data from the second image means.

In an embodiment of the present invention the in-feed means is an in-feed conveyor.

In an embodiment of the present invention a take away conveyor is provided for transporting the items not selected for the collection bin back to the in-feed conveyor or the in-feed station.

In an embodiment of the present invention the axle divides the batching conveyor belt into an in-feed and an out feed portion, and wherein the in-feed portion is at least partially inclining and the out feed portion is at least partially declining.

In an embodiment of the present invention the collection bin comprises weight cells or is positioned on weight cells connected to the computing means. There can be more than one collection bin, where the diverting means diverts the objects between the different collection bins or back to the take-away conveyor to be re-directed to the in-feed stream or ejected if the item is damaged. The collection bin can be a part of a packing apparatus.

In an embodiment of the present invention a relay is connected, via the computing means, to the second image means and to the diverting means.

In an embodiment of the present invention the cleats of the batching conveyor belt have a notch to allow liquid to exit the pocket formed between the cleats.

In an embodiment of the present invention the items to be batched are pelagic fish, such as herring or mackerel or salmon.

In an embodiment of the present invention an electronic nose is positioned adjacent or at the top position between the inclining in-feed end and the declining out feed end of the batching conveyor belt.

In an embodiment of the present invention the apparatus is positioned at a fish farm, such as a salmon farm/factory and where the fish is brought out of aquaculture and batched on site.

In an embodiment of the present invention, transporting the items over the portion of the batching conveyor belt raised by the rolls the items from side to side and creating more than one image view of the items.

In an embodiment of the present invention, the volume of items in the in-feed station is determined by a second image means, which is directed to the in-feed station. The computing means then regulates the transport of items on the in-feed means in response to data from the second image means. The computer regulates the speed of an in-feed conveyor to secure a minimum amount of items in the in-feed station.

In an embodiment of the present invention items, not selected for the collection bin, are transported back to the in-feed conveyor or the in-feed station on a take away conveyor.

In an embodiment of the present invention the computer collects continuously weight data from the collection bin.

In an embodiment of the present invention the computer gives a signal through a relay if an item should be selected or transported back to the in-feed stream, said relay being connected to the second image means and to the diverting means.

In one preferred embodiment the apparatus for imaging and increasing quality of fish during fishing uses the characteristics information from the imaging means and the computing means to determine the length and the speed of towing a fishing net through a body of water.

In an embodiment of the present invention, where the apparatus is on-board a fishing vessel, the computing means sends information on the characteristics of the fish to a controller. In the present context the controller is one or more of a controller of the ship, a decision maker on shore, buyer at a fish market, controller at a fish factory or surveillance officer at an authority on shore. There is a great advantage in being able to send real-time image data and other data on the characteristics of the fish being caught.

In an embodiment of the present invention the characteristic data is stored directly after being obtained in a database or a cloud, where controllers can access the date in real-time or at a later time point.

In an embodiment of the present invention the characteristic data is sent directly to the controller of the ship will give the controller information on size and weight distribution as well as condition of the fish and allow the controller to adjust time and speed of towing. The data may also be sent directly to the owner of the ship to give real-time information on the catching.

In an embodiment of the present invention the characteristic data is sent directly to a controller at shore, where the controller is a factory manager and can make preparations based on the fish being caught. The characteristic data can also be sent directly to a fish market, where the buyer can view images before purchasing. The characteristic data can also be sent to a research facility to determine the size and shape of a straddling stock or any species, such as herring, mackerel or salmon. The characteristic data can also be sent to a surveillance authority to monitor and regulate the fishing of a certain species or how much of a quota for a species has been obtained.

In an embodiment of the present invention the computing means regulates the speed of the in-feeding means and the image means for determining at least one characteristic property of each single items during rolling of the items from side to side as they pass from the inclining to the declining portion of the belt.

In the present context the term "axle" refers to a rolling shaft, spindle, pivot, axis or nose over roller, which is placed under the belt of the conveyor. This shaft is then raised with respect to the in-feed and the out-feed end of the belt.

DETAILED DESCRIPTION OF THE INVENTION

The invention will now be described in relation to the drawings with reference numerals to indicate the different components of the invention.

FIG. 1 shows the different components of the apparatus of the present invention. The drawing is a side view of the device where the outer side has been removed. In this embodiment the apparatus is designed to batch pelagic fish, such as herring or mackerel. An endless in-feeding conveyor belt 1 transports the items to an in-feeding station 2. The end of the in-feed belt shown in FIG. 1 has an inclining portion and a short declining portion in order to allow the items to drop into the in-feed station. The in-feed station is a receptacle with a conveyor belt 3 at the bottom to transfer the items towards the in-feeding end of the cleated conveyor 4. The portion of the cleated conveyor which transports items runs over a roller or axis 5, which raises the transporting portion defining an inclining in-feed portion 6 and a declining out-feed portion 7. The cleats 8 of the cleated conveyor belt 4 are at an interval which creates pocket size holding one herring or mackerel (see enlarged portion of the top part of the cleated conveyor). A first camera 9 is positioned above the in-feed station in obtains images of the in-feed station (see beam A). Data from the first camera is used to determine the current/real time volume/amount of fish in the in-feed station. The computer regulates the speed of the in-feed conveyor 1 based on the volume in the in-feed station, such that if the volume is decreasing the speed of the in-feed conveyor is increased, but if the volume is increasing then the speed of the in-feed conveyor is decreased. This feature is important in order to fill each pocket on the cleated conveyor belt, which is important to provide a faster batching method.

The enlarged portion of FIG. 1 shows the portion of the belt which is raised by the axle. When each pocket 10 is transported over the roller 5, the position of the fish in the pocket may shift as it is carried up by the aft cleat 11 forming the pocket until it is directly above the roller when the aft cleat pushes the fish onto the front cleat 12 which carries the fish the remaining distance. A second camera 13 is positioned above the belt where it passes the roller 5 obtaining images of the fish during the transport over the roller and determining at least one characteristic property of the fish. Because of the shift of the fish in the pocket 10, the camera (see beam B) is able to obtain images of more than one side of the fish. The items fall off the out-feed end of the cleated conveyor belt and a diverting means 14 directs the item either into the collection bin 15 or onto a take-away conveyor 16, for sending the items back to the in-feed conveyor or the in-feed station. The computer collects image data from the second camera and determines which items are selected for the collection bin and which items are re-routed to the in-feed stream or rejected. Items of wrong species or damaged items are rejected or re-routed to another line, while desired items are collected in the collection bin. When the batch is almost full the computer can select from the items on the out-feed end that have the best fit for the batch.

Figure 2:
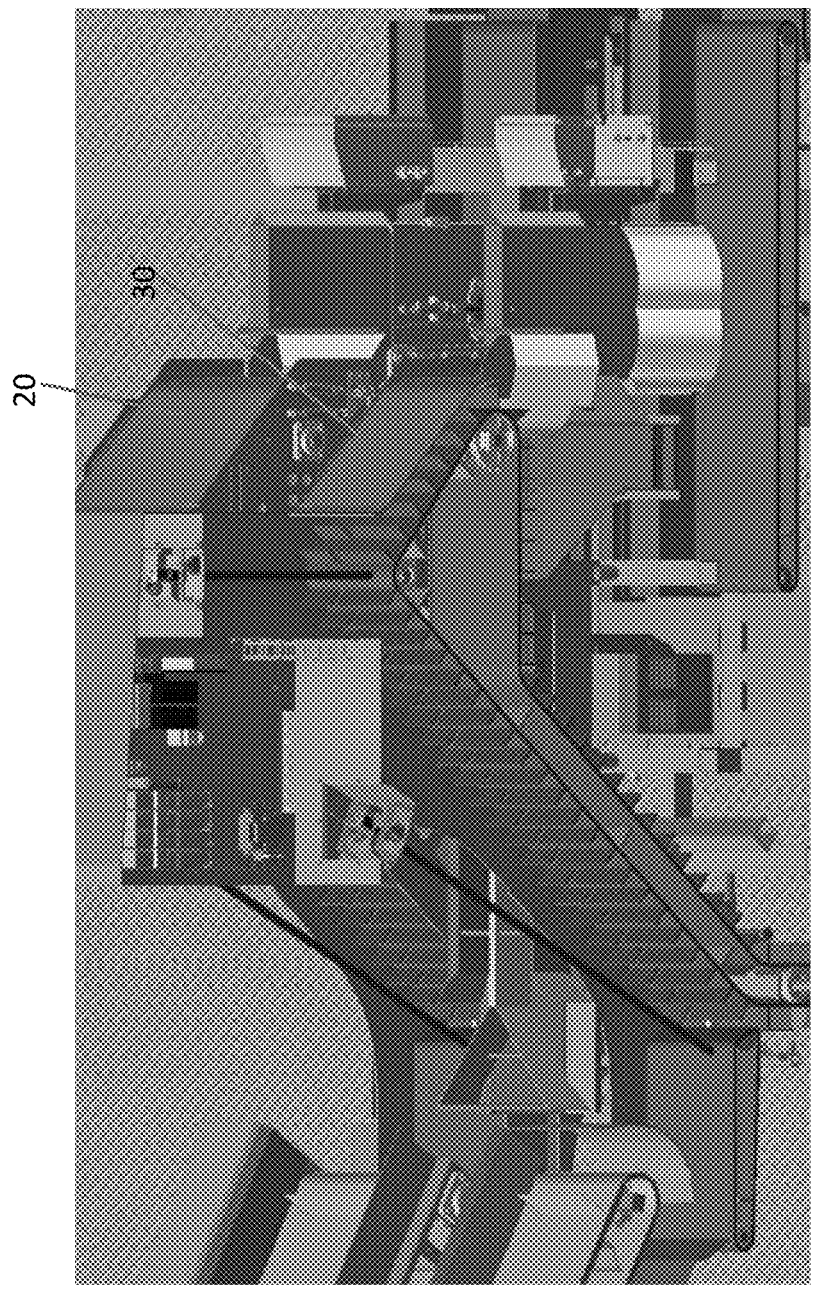
FIG. 2 shows two parallel devices.

FIG. 2 shows two parallel devices of the present invention. The devices are similar to the device shown in FIG. 1 and will not be described in detail here. The figure shows device A (20) and device B (30) which are in an adjacent position with separate in-feed belts and in-feed stations, but they share the take-away conveyor and may share other components. This setup may be advantageous not only for batching one species with more throughput, but to perform sorting and batching of two species such as herring and mackerel.

The present invention covers further embodiments with any combination of features from different embodiments described above. Reference signs in the claims are provided merely as a clarifying example and shall not be construed as limiting the scope of the claims in any way. The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantial constant" shall also cover exactly constant). The terms "a", "an", "first", "second" etc do not preclude a plurality.

The invention claimed is:

1. An apparatus for batching items, the apparatus comprising
   an in-feed means,
   an in-feed station,
   a batching conveyor belt, where the batching conveyor belt is a cleated conveyor belt and where a portion of the batching conveyor belt is raised by an axle between an in-feed and an out feed end of the batching conveyor belt,
   a first image means directed to the in-feed station to detect the volume of items in the in-feed station,
   a second image means, said second image means determines at least one characteristic property of the items as the items pass over the axle,
   diverting means,
   a collection bin, and
   computing means
   wherein the computing means regulates the transport of items on the in-feed means to the in-feed station in response to data from the first image means, and
   wherein selected items are diverted to the collection bin by the diverting means based on data from the second image means.

2. The apparatus according to claim 1, wherein the in-feed means is an in-feed conveyor.

3. The apparatus according to claim 1, further comprising a take away conveyor for transporting the items not selected for the collection bin back to the in-feed conveyor or the in-feed station.

4. The apparatus according to claim 1, wherein the axis divides the batching conveyor belt into an in-feed and an out feed portion, and wherein the in-feed portion is at least partially inclining and the out feed portion is at least partially declining.

5. The apparatus according to claim 1, wherein the collection bin comprises weight cells connected to the computing means.

6. The apparatus according to claim 1, wherein the collection bin is a part of a packing apparatus.

7. The apparatus according to claim 1, wherein the cleats of the batching conveyor belt have a notch to allow liquid to exit the pocket formed between the cleats.

8. The apparatus according to claim 1, wherein an electronic nose is positioned adjacent or at the top position between the inclining in-feed end and the declining out feed end of the batching conveyor belt.

9. A method for batching items, the method comprising the steps of:
   transporting the items to an in-feed station by an in-feed means,
   transporting the items from the in-feed station to a collection bin on a batching conveyor, where the batching conveyor belt is a cleated conveyor belt and where a portion of the batching conveyor belt is raised by an axle between an in-feed and an out feed end of the batching conveyor belt,
   determining the volume of items in the in-feed station by a first image means directed to the in-feed station,
   determining at least one characteristic property of the items as the items pass over the axis as they are transported from the in-feed to the out feed end of the batching conveyor belt,
   diverting selected items to the collection bin by a diverting means,
   wherein the computing means regulates the transport of items on the in-feed means to the in-feed station in response to data from the first image means, and
   wherein selected items are diverted to the collection bin by the diverting means based on data from the second image means.

10. The method according to claim 9, wherein transporting the items over the portion of the batching conveyor belt raised by the rolls the items from side to side and creating more than one image view of the items.

11. The method according to claim 9, wherein the computer regulates the speed of an in-feed conveyor to secure a minimum amount of items in the in-feed station.

12. The method according to claim 9, wherein items not selected for the collection bin are transported back to the in-feed conveyor or the in-feed station on a take away conveyor.

13. The method according to claim 9, wherein the computer collects continuously weight data from the collection bin.

14. The method according to claim 9, wherein the computer gives a signal through a relay if an item should be selected or transported back to the in-feed stream, said relay being connected to the second image means and to the diverting means.

15. The method according to claim 9, wherein the items to be batched are pelagic fish, such as herring or mackerel.

16. The method according to claim 9, wherein the speed of the in-feeding means and determining at least one characteristic property of each single items during rolling of the items from side to side as they pass from the inclining to the declining portion of the belt is controlled by the computing means.

17. The method according to claim 9, wherein the computing means sends information on the characteristics of the fish to a controller.

18. The method according to claim 9, wherein the computing means stores information on the characteristics of the fish directly after the information has been obtained in a database or a cloud, where controllers can access the date in real-time or at a later time point.

19. The method according to claim 18, wherein the controller is one or more of a controller of the ship, a decision maker on shore, buyer at a fish market, controller at a fish factory or surveillance officer at an authority on shore.

20. A fishing vessel for catching and slaughtering fish, said fishing vessel comprising an apparatus for batching items, the apparatus comprising:
   an in-feed means,
   an in-feed station,
   a batching conveyor belt, where the batching conveyor belt is a cleated conveyor belt and where a portion of the batching conveyor belt is raised by an axle between an in-feed and an out feed end of the batching conveyor belt,
   a first image means directed to the in-feed station to detect the volume of items in the in-feed station,
   a second image means, said second image means determines at least one characteristic property of the items as the items pass over the axle,
   diverting means,
   a collection bin, and
   computing means
   wherein the computing means regulates the transport of items on the in-feed means to the in-feed station in response to data from the first image means, and
   wherein selected items are diverted to the collection bin by the diverting means based on data from the second image means.

* * * * *